Aug. 23, 1932.　　　　I. H. LEVIN　　　　1,873,771
METHOD AND APPARATUS FOR FRACTIONAL DISTILLATION
Filed June 1, 1925
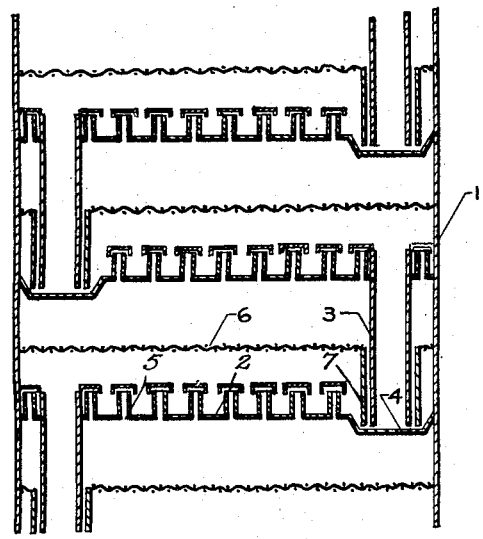
INVENTOR
Isaac H. Levin Patented Aug. 23, 1932

1,873,771

UNITED STATES PATENT OFFICE

ISAAC H. LEVIN, OF PITTSBURGH, PENNSYLVANIA, ASSIGNOR, BY MESNE ASSIGNMENTS, TO GAS INDUSTRIES COMPANY, OF PITTSBURGH, PENNSYLVANIA, A CORPORATION OF PENNSYLVANIA

METHOD AND APPARATUS FOR FRACTIONAL DISTILLATION

Application filed June 1, 1925. Serial No. 34,072.

The invention relates to the step in the operation and construction of a fractionating column wherein a liquefied mixture passes down a fractionating column countercurrent to an ascending stream of vapor. The less volatile constituents of the vapor condense, liberating some of the more volatile constituents from the liquid, whereby the ascending vapor becomes richer in the more volatile constituents and the liquid becomes richer in the less volatile constituents, thus bringing about a separation of the various constituents.

The invention relates in particular to the separation of the constituents of the air. When the invention is applied to such a separation, the primary object is to produce oxygen, free from the more volatile constituents, and of a purity of 99.5% or better. A further object is to bring about a complete condensation of the vapors of the less volatile constiutent, that is, the oxygen, as it rises in the fractionating column. The combination of these objectives results in the production of oxygen of a purity of 99.5% and better, while at the same time the yield of oxygen for a given amount of air treated in the fractionating column is practically a maximum for a given composition of the reflux poured into the top of the column.

Another object of the invention is to obtain the former results in a single column instead of first making a crude oxygen and then fractionating the crude oxygen in another column. The use of this invention will enable one to operate the column at much higher capacities.

A further object of the invention is to distribute the ascending vapors evenly thru the column. A further object of the invention is to prevent the ascending vapors from channeling.

The invention can be readily understood by referring to the accompanying drawing, which embodies a device for carrying out the present invention. Numeral 1 indicates a section of fractionating column of the perforated plate type. The column is usually divided into trays or plates 2. Each tray has an overflow pipe 3, and a seal or sump 4, and openings 5 in the plates.

The usual column is constructed essentially as described. It operates as follows. Liquid fills the plates till it runs down the overflow pipe into the plate below. It then runs along the tray to a point diametrically opposite and runs down the overflow pipe to the next lower plate thus traveling in horizontal courses. The vapors rise from the plate below and ascend thru openings 5 thru the liquid and then rise into the next plate above. As the vapor passes thru the liquid, liquid is sprayed into the space between two trays and more or less liquid is carried into the tray above along with the vapors. This short circuits the plates, as it were, to some extent and the degree of separation expected from this section of the column is not realized.

The efficiency of the section of the column is further reduced by the tendency of some of the vapor passing thru the liquid without completely interchanging its heat content with the liquid of the tray before passing into the tray above. If the separation required consists of removing one vapor from another where there is only a few degrees difference in the boiling point, the efficiency of the separation becomes very low indeed. On the one hand the conditions that bring about the best interchange between the vapors and the liquid, namely, the deformation of a bubble of vapor as it passes thru the liquid, agitation of solution and high velocities of travel of the vapor thru the solution, are the very conditions that tend to increase priming and that permit vapor to pass thru the solution without coming into complete interchange with same.

The above conditions result in the manufacture of impure oxygen by failure to make a clean separation between the argon and the oxygen and in poor yields, because some of the oxygen vapor is driven thru the column and out with the nitrogen vapor.

To correct this condition some have resorted to removing the crude impure oxygen and treating same in an additional fractionating column. I have found that by employing a separator between the trays the above difficulties are overcome and the distillation can be carried out in but one column.

Referring to the drawing, a separator consisting of a screen 6 is placed above the normal height of the liquid of the tray and a drain pipe 7 for this screen is placed about the overflow pipe 3 and into seal or sump 4. Spray strikes the underside of the screen some of this spray drops back to tray and what passes thru is made to come into very intimate contact with the vapor that forces the liquid thru the screen; finally the liquid then deposits on the screen and runs down the drain pipe 7 and mingles with the liquid coming from the plate above. The liquid is again passed thru the same tray. This separator can be made of wire cloth of suitable mesh depending upon the size of column and materials handled.

This separator can be a series of louvers deflecting the upward rise of vapor and spray or it can be made to embody any of the well known principles employed in making moisture separators.

When this invention is applied to a filled type column the moisture separator is placed at several sections: each at some unit of length, say a foot or such, depending upon the nature of the distillation.

In addition to the other advantages of my invention to the column in general, the serious draw-back of channeling in the filled type column in particular is overcome by the use of my invention. It will readily be noticed that channeling will be limited to the sections or unit lengths of the column.

The above are but examples of the application of the invention. The invention can be applied to other forms of columns and to make other separations than the one herein described.

I claim:

1. A fractionating apparatus comprising a column, trays therein arranged one above the other, said trays having openings so that vapor may rise therethrough, said trays each having a sump, an overflow pipe leading from each tray to the sump beneath so that separated matter will mix with matter passing downwardly through the overflow pipes as it discharges into the respective trays, a separator between each pair of trays above the inlet of the adjacent overflow pipe and out of the path of travel of the descending liquid, and drain pipes leading from the separators to the sumps.

2. A fractionating apparatus comprising a column, trays therein one above the other, said trays having openings so that vapor may rise therethrough, the lowermost tray having a sump, an overflow pipe leading from the upper tray to said sump, a separator between the trays and above the inlet of said overflow pipe and out of the path of travel of the descending liquid and having a drain leading to said sump.

3. A fractionating apparatus comprising a column, trays therein one above the other, said trays having openings so that vapor may rise therethrough, a separator between each pair of trays positioned out of the path of the descending liquid, and means whereby material in the trays and separated moisture from vapor may drain into the tray below at substantially a common point, and below the level of the material therein.

4. A fractionating apparatus comprising a column, trays therein one above the other, said trays having openings so that vapor may rise therethrough, said trays each having a sump, an overflow pipe leading from each tray to the sump beneath, a separator screen between each two trays positioned out of the path of the descending liquid, and drain members leading from the separator screens to said sumps, said drain members being larger than and surrounding said overflow pipes.

5. The step in the process of fractional distillation which includes alternately subjecting a vapor to a wetting action of a liquid and to a drying action consisting in passing said vapor upwardly through a liquid traveling in a generally downward direction and in courses in different directions, in separating from the vapor between such courses the moisture gathered by the vapor in its rise through the liquid and collecting this moisture on a plane between the courses, and in returning the separated moisture out of the path of travel of the rising vapor to the course of liquid below the zone of separation and at substantially the same location as the latter course receives the liquid from above.

6. The step, in the process of fractional distillation which includes alternately subjecting a vapor to a wetting action of a liquid and to a drying action consisting in passing said vapor upwardly through a liquid traveling in a generally downward direction and in courses in different directions, in separating from the vapor between such courses the moisture gathered by the vapor in its rise through the liquid and collecting this moisture on a plane between the courses, and in returning the separated moisture out of the path of travel of the rising vapor to the course of liquid below the zone of separation.

7. The step in the process of fractional distillation which includes alternately subjecting a vapor to a wetting action of a liquid and to a drying action consisting in passing said vapor upwardly through a liquid traveling in a generally downward direction and in courses in different directions, each course communicating with the course below the same at a single location and below the level of such course, in separating from the vapor between such courses the moisture gathered thereby in its rise through the liquid and collecting this moisture on a plane between the courses, and in returning the separated moisture out of the path of the rising vapor to the course of liquid below the same and at the respective location aforesaid.

8. Fractionating apparatus comprising a column, fractionating plates therein one above another and provided with openings for passage of vapors upwardly therethrough, a separator between a pair of said plates for removing liquid from the vapors, an overflow pipe leading from the upper to the lower of said fractionating plates, whereby liquid may be conducted from an upper to a lower plate without coming into contact with said separator, and a downtake pipe leading from said separator to a lower fractionating plate, whereby liquid removed from the vapors by said separator may be conducted to a lower plate.

9. Fractionating apparatus comprising a column, fractionating plates therein one above another and provided with openings for passage of vapors upwardly therethrough, a separator between a pair of said plates for removing liquid from the vapors, an overflow pipe leading from the upper to the lower of said fractionating plates, whereby liquid may be conducted from an upper to a lower plate without coming into contact with said separator, and a downtake pipe leading from said separator to a lower fractionating plate, whereby liquid removed from the vapors by said separator may be conducted to a lower plate, said downtake pipe surrounding said overflow pipe.

10. Fractionating apparatus comprising a column, fractionating plates therein one above another and provided with openings for passage of vapors upwardly therethrough, a separator between plates for removing liquid from the vapors, an overflow pipe leading from an upper to a lower of said fractionating plates, whereby liquid may be conducted from an upper to a lower plate without coming into contact with said separator, and a downtake pipe leading from said separator to a lower fractionating plate, whereby liquid removed from the vapors by said separator may be conducted to a lower plate.

11. Fractionating apparatus comprising a column, fractionating plates therein one above another and provided with openings for passage of vapors upwardly therethrough, a separator between plates for removing liquid from the vapors, an overflow pipe leading from an upper to a lower of said fractionating plates, whereby liquid may be conducted from an upper to a lower plate without coming into contact with said separator, and a downtake pipe leading from said separator to a lower fractionating plate, whereby liquid removed from the vapors by said separator may be conducted to a lower plate, said downtake pipe surrounding said overflow pipe.

In testimony whereof I affix my signature.

ISAAC H. LEVIN.